United States Patent [19]

Bloom

[11] Patent Number: 4,524,480
[45] Date of Patent: Jun. 25, 1985

[54] WIRE WHEEL COVER BRUSH

[75] Inventor: Stephen R. Bloom, Bloomfield Hills, Mich.

[73] Assignee: Perfection Automotive Products Corp., Livonia, Mich.

[21] Appl. No.: 519,048

[22] Filed: Aug. 1, 1983

[51] Int. Cl.³ ............................................... A46B 9/02
[52] U.S. Cl. .................................. 15/159 A; 15/195; 15/DIG. 5
[58] Field of Search ................ 15/195, 197, 199, 200, 15/159 R, 160, 256.6, 159 A, DIG. 5; 280/158.1, 158 R, 158 A; D4/38

[56] References Cited

U.S. PATENT DOCUMENTS

| | | | |
|---|---|---|---|
| D. 221,610 | 8/1971 | McManners | D4/38 |
| 1,631,015 | 5/1927 | Cox | 15/160 |
| 1,958,134 | 5/1934 | Dike | 15/160 |
| 3,050,763 | 8/1962 | Martin | 15/197 |
| 3,153,800 | 10/1964 | Trotin | 15/159 A |
| 4,161,050 | 7/1979 | Sasaki et al. | 15/DIG. 5 X |
| 4,365,380 | 12/1982 | Fassler | 15/160 X |

Primary Examiner—Harvey C. Hornsby
Assistant Examiner—Arthur D. Dahlberg
Attorney, Agent, or Firm—Cullen, Sloman, Cantor, Grauer, Scott and Rutherford

[57] ABSTRACT

A wire wheel cover brush, for cleaning automobile wire and style type wheel covers having a brush handle portion, tapering head portion and bristle portion. The brush bristle portion has a plurality of individual U-shaped or hairpin bent brush bristles gathered together in a plurality of tufts. The tufts are embedded in holes drilled or otherwise formed in the brush head portion and secured by fastening means. The tufts are arranged in three distinct groupings each in a circular pattern. The groupings are positioned in a triangular arrangement separated by a predetermined space to allow passage of the wire wheel cover spokes between the groupings, allowing the groupings to make maximum and direct contact with the back-up plate, simultaneously cleaning the back-up plate and wire spokes. An alternative embodiment is disclosed in which the brush bristles are of two different lengths.

1 Claim, 7 Drawing Figures

U.S. Patent   Jun. 25, 1985   4,524,480
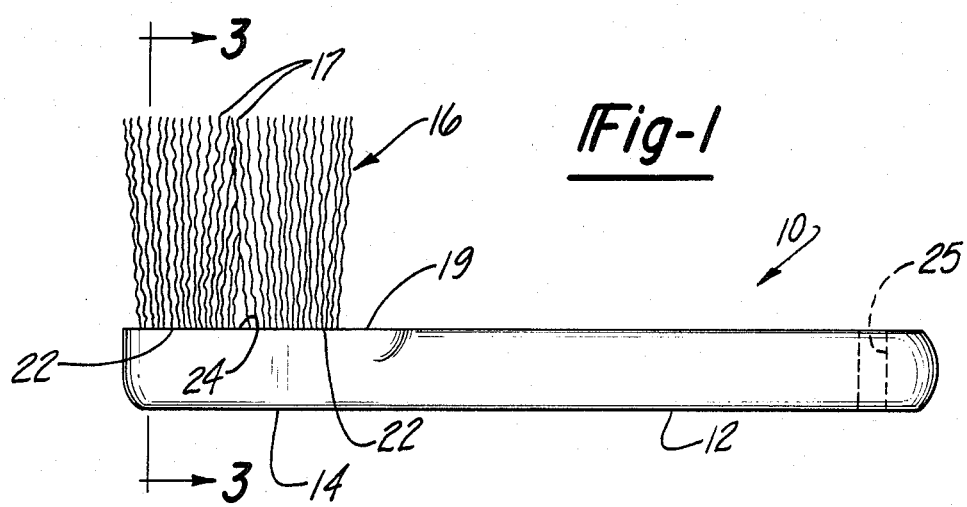
Fig-1
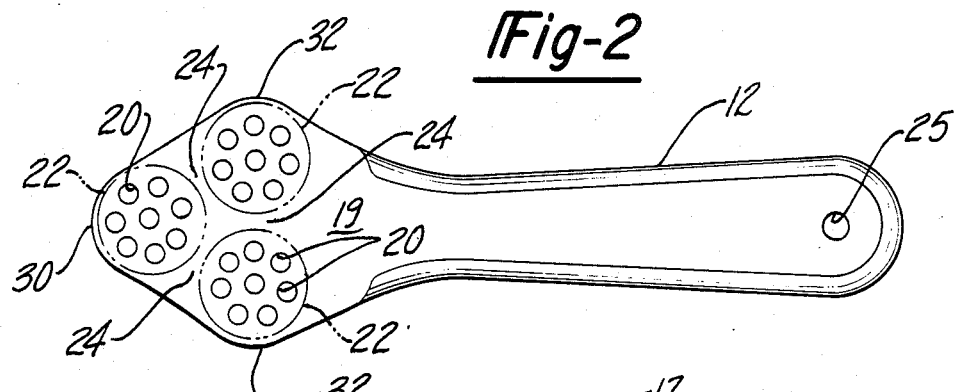
Fig-2
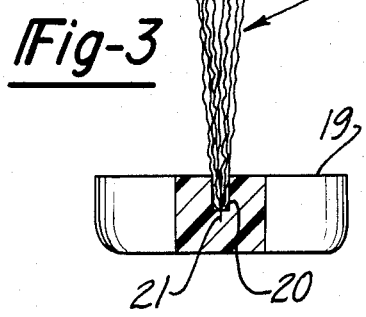
Fig-3
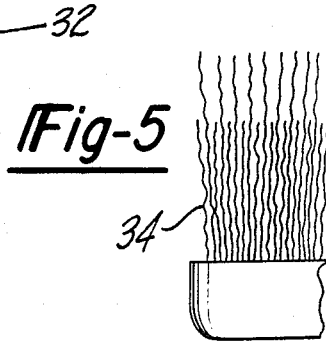
Fig-5
Fig-4
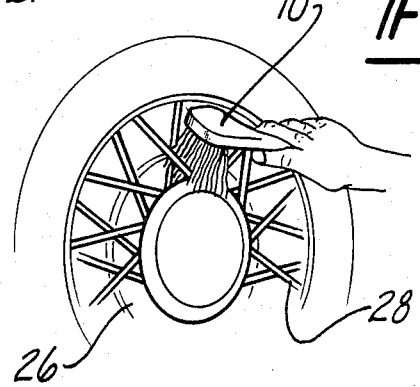
Fig-6
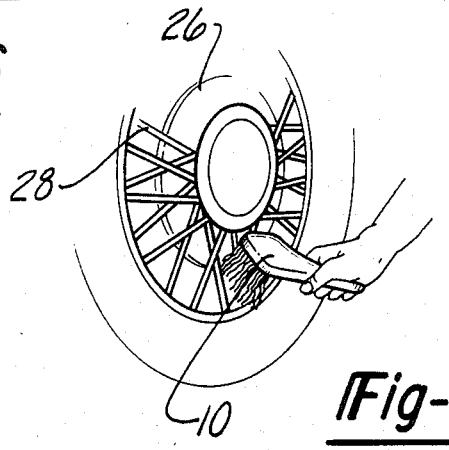
Fig-7

WIRE WHEEL COVER BRUSH

BACKGROUND OF THE INVENTION

The present invention relates to cleaning brushes for wheel covers and more particularly to cleaning brushes for wire or style type wheel covers used for automobile wheels. In washing wire wheel covers it is particularly difficult to get the bristles in back of the wire spokes to the shiny metal back-up plate so as to simultaneously clean both the wire spokes and the back-up plate.

Many brushes have been used in an attempt to effectively and efficiently clean the wire wheel cover spokes and the back-up plate. However, due to the design of the wire wheel covers, particularly the crossing of the wire spokes, such attempts have been unsatisfactory.

Thus, there has been a need for a wire wheel cover brush having a bristle pattern or grouping arrangement which will enable the brush bristles to get through the wire wheel cover spokes to the back-up plate and simultaneously clean both the wire spokes and the back-up plate without having the brush bristles within each grouping separated by the wire spokes.

Furthermore, there has been a need for a wire wheel cover brush having a brush bristle portion construction which will provide the bristles with long life, sufficient stiffness and water carrying capability.

Thus, the invention herein relates to a wire wheel cover brush which is particularly useful in handling the foregoing problems encountered in washing wire or style type wheel covers used for automobile wheels.

SUMMARY OF THE INVENTION

The invention herein contemplates a brush for washing automotive wire wheel covers, particularly the wire wheel spokes and the back-up plate. In general, the wire wheel cover brush of the present invention comprises a brush handle portion, brush head portion and brush bristle portion, with the handle portion adapted to be gripped by the user's hand.

The head portion is tapered from two rounded side edges to a rounded front edge and the head portion converges, opposite the front edge, towards the handle portion. The rounded front edge and side edges enable the brush to get between the wire spokes facilitating penetration of the brush bristle portion behind the plane of the wire wheel cover spokes to the back-up plate.

The brush bristle portion is made up of a plurality of U-shaped or hairpin bent bristles of sufficient length to contact the wire wheel cover back-up plate. The bristles are gathered together in a plurality of bristle tufts. The bristle tufts are anchored into the brush head portion by a fastening means and project outwardly from the upper surface of the brush head portion. The tufts are arranged in three groupings with sufficient space between each grouping to allow the brush bristle groupings to pass between the wire wheel cover spokes and simultaneously clean the wire spokes and back-up plate without the brush bristles of the groupings being separated by the wire spokes. The groupings are positioned in a triangular arrangement. The individual tufts of each grouping are positioned in a dense circular pattern to scrub and clean the back-up plate without an undue amount of bristle bending.

In an alternative embodiment, each brush bristle tuft is composed of two different lengths of bristles. Providing two different bristle lengths enables the brush bristles to get through the wire spokes with the longer bristles contacting the back-up plate with sufficient grouping density, while some of the shorter bristles contact and fold around the wire spokes, permitting simultaneous cleaning of the wire spokes and back-up plate.

DESCRIPTION OF THE DRAWINGS

These various objects, benefits and advantages of the present invention will become apparent upon reading the following description of the invention in conjunction with the attached drawings, where like reference numerals identify corresponding components.

FIG. 1 is a side view of the wire wheel cover brush of the present invention where the number of brush bristles is greatly reduced for ease of illustration.

FIG. 2 is a top plan view of the wire wheel cover brush of the present invention.

FIG. 3 is cross-sectional view of the wire wheel cover brush taken in the direction of arrows 3—3 of FIG. 1.

FIG. 4 is a side view of a single U-shaped or hairpin bent brush bristle.

FIG. 5 is a fragmentary view of an alternative embodiment of the wire wheel cover brush showing two different brush bristle lengths where the number of brush bristles is greatly reduced for ease of illustration.

FIG. 6 illustrates the wire wheel cover brush in use on a wire wheel cover.

FIG. 7, similar to FIG. 6, illustrates the wire wheel cover brush in use on a wire wheel cover.

DETAILED DESCRIPTION

Referring to FIGS. 1 and 2 of the drawings, the brush of the present invention is shown generally as 10 having a brush handle portion 12, brush head portion 14 and brush bristle portion 16.

Brush bristle portion 16 is comprised of a plurality of individual brush bristles 17. Brush bristles 17 are preferably formed in a hairpin bent or U-shaped configuration and are gathered in clusters or tufts 18 (see FIGS. 3 and 4). Bristles 17 are preferably made of a strong, resilient material such as crimped nylon fiber. But, the bristles may also be formed to desired length and a tuft made of a number of those individual bristles heat sealed together at their lower ends. The particular nylon fiber is not significant to the invention herein, so long as it meets the physical requirements of providing long life, sufficient stiffness and water carrying capability.

Tufts 18 are affixed to upper surface 19 of head portion 14 by any conventional manner adapted to provide secure attachment. In the preferred embodiment a plurality of tuft anchoring holes 20 are drilled normal to upper surface 19 or otherwise formed in head portion 14, and tufts 18 are embedded in holes 20 and fastened by staples 21 or an epoxy resin (see FIG. 3).

The brush bristle tufts 18 are arranged in three distinct groupings 22. Groupings 22 are positioned in a triangular arrangement. This allows brush bristle groupings 22 to penetrate between wire wheel cover spokes 28 simultaneously cleaning back-up plate 26 and wire spokes 28. Groupings 22 are separated by a predetermined space 24 allowing passage of wire spokes 28 between groupings 22 without bristles 17 of groupings 22 being separated by wire spokes 28.

Within each grouping 22, the anchoring holes 20 are positioned in a circular pattern. The particular pattern of anchoring holes 20 is not essential to the present invention as long as predetermined space 24 is maintained and sufficient bristle density is provided.

A bore 25 is provided in handle portion 12 for storing brush 10 in a hanging position.

In use, and referring to FIGS. 6 and 7, the user grasps handle portion 12 in the usual manner. Upon brushing, brush bristle groupings 22 will pass through spokes 28 with the ends of bristles 17 contacting back-up plate 26. The triangular arrangement of groupings 22 enables the wire spokes 28 to pass through predetermined space 24 without unduly interfering with the integrity of groupings 22. Thus, the brush bristles 17 will wrap around wire spokes 29 and the ends of brush bristles 17 will make maximum and direct contact with back-up plate 26, simultaneously cleaning back-up plate 26 and wire spokes 28 without brush bristles 17 of groupings 22 being separated by wire spokes 28.

Brush head portion 14 tapers from rounded side edges 32 to rounded front edge 30. The tapering configuration of head portion 14 enables rounded edges 30 and 32 to get between wire spokes 28 enabling further penetration of brush bristles 17 contacting back-up plate 26, as illustrated in FIGS. 6 and 7. In addition, brush head portion 14 converges, opposite front edge 30, towards handle portion 12 to prevent wire wheel cover brush 10 from hang-ups upon withdrawal of head portion 14 from between wire spokes 28.

An alternative embodiment may be provided whereby there are at least two different lengths of brush bristles, long brush bristles 17 and short brush bristles 34. For example, short bristles 34 may extend approximately ¾ of an inch shorter than brush bristles 17 and long brush bristles 17 may extend approximately 2¼ inches in length. Bristles 17 and 34 may be provided in approximately equal proportions and extend vertically from brush head portion 14. The particular length of bristles 17 is not essential to the present invention as long as bristles 17 are of sufficient length to make contact with back-up plate 26.

It will be understood that brush handle portion 12 may be formed to any conventional shape and size. For example, handle portion 12 may be of sufficient length to provide brush 10 with an overall length of approximately 8 inches and a thickness of approximately ¾ of an inch.

Having fully described an operative embodiment of this invention, I now claim:

1. A wire wheel cover brush for cleaning a vehicle wire wheel cover having a plurality of wire wheel cover spokes and a spaced apart wire wheel cover back-up plate, comprising:

a handle portion adapted for being gripped by a user;

a tapering head portion having a rounded front edge and two rounded side edges, said head portion including first and second side surfaces tapering from said side edges to said front edge to form a first corner at said front edge and to allow said edges to get between said wire wheel cover spokes, said head portion converging from said two side edges, opposite said front edge, towards said handle portion to prevent said head portion from being hung up between said wire wheel cover spokes upon removal from behind the plane of said wire wheel cover spokes, third and fourth side surfaces tapering from said side edges to said handle portion, said third side surface and said first side surface converging to one of said side edges to form a second corner at said one side edge, and said fourth side surface and second side surface converging to the other side edge to form a third corner at said other side edge;

a brush bristle portion projecting from the upper surface of said head portion, wherein said brush bristle portion having at least two different lengths of brush bristles so that said longer brush bristles will get through said wire wheel cover spokes to said back-up plate and some of said shorter brush brustles will contact and fold around said wire wheel cover spokes, and said brush bristle portion having a plurality of U-shaped bristles gathered together in a plurality of tufts, and said tufts positioned in only three circular groupings of sufficient density to prevent undue bending of said brush bristles upon contacting said back-up plate, a plurality of tuft anchoring holes formed in said brush head portion upper surface normal to said brush head portion upper surface, said anchoring holes positioned only in said three circular groupings and fastening means for anchoring said tufts in said tuft anchoring holes, a first circular grouping positioned at said first corner, said first grouping substantially occupying the space defined between said first and second side surfaces adjacent said front edge, a second circular grouping positioned at said second corner, said second grouping substantially occupying the space defined between said first and third side surfaces adjacent said one side edge, and a third circular grouping positioned at said third corner, said third grouping substantially occupying the space defined between said second and fourth side surfaces adjacent said other side edge;

said front edge and said side edges of said head portion being slightly rounded to allow further penetration of said bristle portion beyond the plane of said wire wheel spokes; and said groupings being positioned in a triangular arrangement, a predetermined space separating said groupings sufficient to allow said wire spokes to pass between said groupings whereby said groupings can penetrate between said wire spokes to said back-up plate and simultaneously clean both said wire spokes and said back-up plate without said brush bristles within each grouping being separated by said spokes.

* * * * *